US006764202B1

(12) United States Patent
Herring et al.

(10) Patent No.: US 6,764,202 B1
(45) Date of Patent: Jul. 20, 2004

(54) ILLUMINATOR

(76) Inventors: Larry Herring, 17881 Queen Rd., Laurinburg, NC (US) 28352; Judy Herring, 17881 Queen Rd., Laurinburg, NC (US) 28352

(*) Notice: Subject to any disclaimer, the term of this patent is extended or adjusted under 35 U.S.C. 154(b) by 50 days.

(21) Appl. No.: 10/255,780

(22) Filed: Sep. 25, 2002

(51) Int. Cl.$^7$ ............................................. F21V 21/00
(52) U.S. Cl. ...................... 362/371; 362/183; 362/287; 362/322
(58) Field of Search ................................. 362/371, 183, 362/322, 319, 276, 372, 370, 285, 287, 289, 418, 419, 449, 368, 191, 277, 282, 433, 441, 446

(56) References Cited

U.S. PATENT DOCUMENTS 5,003,441 A * 3/1991 Crowe et al. ............... 362/183
5,055,984 A * 10/1991 Hung et al. ................. 362/183

* cited by examiner

Primary Examiner—Thomas M. Sember
Assistant Examiner—Bao Q Truong

(57) ABSTRACT

Illuminators illuminate tombstones. Human beings frequently desire to remember and show respect for their departed loved ones through the use of vigil lights. Illuminators are solar powered, thereby eliminating the need for an electrical outlet near the grave site and ensuring that the tombstone will always be illuminated at night. An alignment adjuster and lens are provided so that the emitted light is focused on the desired location. A rod with a pointed end is included to secure the illuminator in place on the ground.

10 Claims, 2 Drawing Sheets

ILLUMINATOR

BACKGROUND OF THE INVENTION

1. Field of the Invention

The present invention relates to an illuminator for use in connection with highlighting objects in the dark. The illuminator has particular utility in connection with illuminating tombstones.

2. Description of the Prior Art

Illuminators are desirable for illuminating tombstones. Human beings frequently desire to remember and show respect for their departed loved ones. Markers, monuments, and candles are among the methods used. Illuminators provide a low maintenance method for providing a vigil light by being solar powered. This eliminates the need for an electrical outlet near the grave site and ensures that the tombstone will always be illuminated at night.

The use of devices for the projection/reflection of images is known in the prior art. For example, U.S. Pat. No. 5,615,937 to Bellanger discloses a device for the projection/reflection of images. However, the Bellanger '937 patent does not have a solar collector, and has further drawbacks of lacking a bulb.

U.S. Pat. No. 4,304,076 to Splendora discloses monuments that comprise a substantially transparent member. However, the Splendora '076 patent does not have a rod, and additionally does not have an alignment adjuster for the light.

Similarly, U.S. Pat. No. 4,489,669 to Carman discloses a marker that comprises an elastic visible element connected to a base. However, the Carman '669 patent does not have a solar collector, and cannot adjust the alignment of the light.

In addition, U.S. Pat. No. 4,227,325 to Whitford discloses a grave marker that has a chamber for displaying pictures, photographs, or the like. However, the Whitford '325 patent does not have a solar collector, and also does not have a bulb.

Furthermore, U.S. Pat. No. 3,928,928 to Kalust discloses an audiovisual memorial that includes a recording. However, the Kalust '928 patent does not have a solar collector, and further lacks a bulb.

Lastly, U.S. Pat. No. Des. 364,260 to Landrey discloses a tombstone that has ". . . but a memory" printed on it. However, the Landrey '2.60 patent does not have a solar collector, and has the additional deficiency of lacking a bulb.

While the above-described devices fulfill their respective, particular objectives and requirements, the aforementioned patents do not describe an illuminator that allows illuminating tombstones. The Bellanger '937 patent, the Whitford '325 patent, the Kalust '928 patent, and the Landrey '260 patent make no provision for a solar collector. The Bellanger '937 patent, the Whitford '325 patent, the Kalust '928 patent, and the Landreyl'260 patent do not have a bulb. The Splendora '076 patent lacks a rod. The Splendora '076 patent and the Carman '669 patent cannot adjust the alignment of the light.

Therefore, a need exists for a new and improved illuminator that can be used for illuminating tombstones. In this regard, the present invention substantially fulfills this need. In this respect, the illuminator according to the present invention substantially departs from the conventional concepts and designs of the prior art, and in doing so provides an apparatus primarily developed for the purpose of illuminating tombstones.

SUMMARY OF THE INVENTION

In view of the foregoing disadvantages inherent in the known types of devices for the projection/reflection of images now present in the prior art, the present invention provides an improved illuminator, and overcomes the above-mentioned disadvantages and drawbacks of the prior art. As such, the general purpose of the present invention, which will be described subsequently in greater detail, is to provide a new and improved illuminator which has all the advantages of the prior art mentioned heretofore and many novel features that result in an illuminator which is not anticipated, rendered obvious, suggested, or even implied by the prior art, either alone or in any combination thereof.

To attain this, the present invention essentially comprises a hollow housing with a rod, a light, and a power source connected to it.

There has thus been outlined, rather broadly, the more important features of the invention in order that the detailed description thereof that follows may be better understood and in order that the present contribution to the art may be better appreciated.

The invention may also include the power source being a solar collector with a rechargeable battery, a battery, or an electrical outlet. The rod may have a pointed end. The housing may consist of an enclosure having two open sides, two L-shaped sides with a concave edge, a top, and a back. The light may consist of a light housing with a lens covering its front and an enclosed reflector, along with a bulb holder and a bulb mounted on its-rear. A wire may connect the light to the power source, or to a switch such as a photocell light detector. The light may have an alignment adjuster attached to its bottom. The alignment adjuster may have an alignment adjustment slot which is connected to the rod by a screw and wing nut. The rod and housing may be made of steel, aluminum, titanium, plastic, or carbon fiber composite. The reflector may be made of steel, aluminum, metal-coated plastic, or mirrors. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved illuminator that has all of the advantages of the prior art devices for the projection/reflection of images and none of the disadvantages.

It is another object of the present invention to provide a new and improved illuminator that may be easily and efficiently manufactured and marketed An even further object of the present invention is to provide a new and improved illuminator that has a low cost of manufacture with regard to both materials and labor, and which accordingly is then susceptible of low prices of sale to the consuming public, thereby making such illuminator economically available to the buying public.

Still another object of the present invention is to provide a new illuminator that provides in the apparatuses and methods of the prior art some of the advantages thereof, while simultaneously overcoming some of the disadvantages normally associated therewith.

Even still another object of the present invention is to provide an illuminator for illuminating tombstones. This allows the user to illuminate a tombstone without requiring access to an electrical outlet.

Still yet another object of the present invention is to provide an illuminator for illuminating tombstones. This makes it possible to illuminate a tombstone with a minimum of maintenance.

An additional object of the present invention is to provide an illuminator for illuminating tombstones. This allows the user to adjust where the light shines.

A further object of the present invention is to provide an illuminator for illuminating tombstones. This allows the user to secure the illuminator in place.

Lastly, it is an object of the present invention to provide a new and improved illuminator for illuminating tombstones.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated current embodiments of the invention.

BRIEF DESCRIPTION OF THE DRAWINGS

The invention will be better understood and objects other than those set forth above will become apparent when consideration is given to the following detailed description thereof Such description makes reference to the annexed drawings wherein.

The same reference numerals refer to the same parts throughout the various figures.

DESCRIPTION OF THE CURRENT EMBODIMENT

Figure 1:
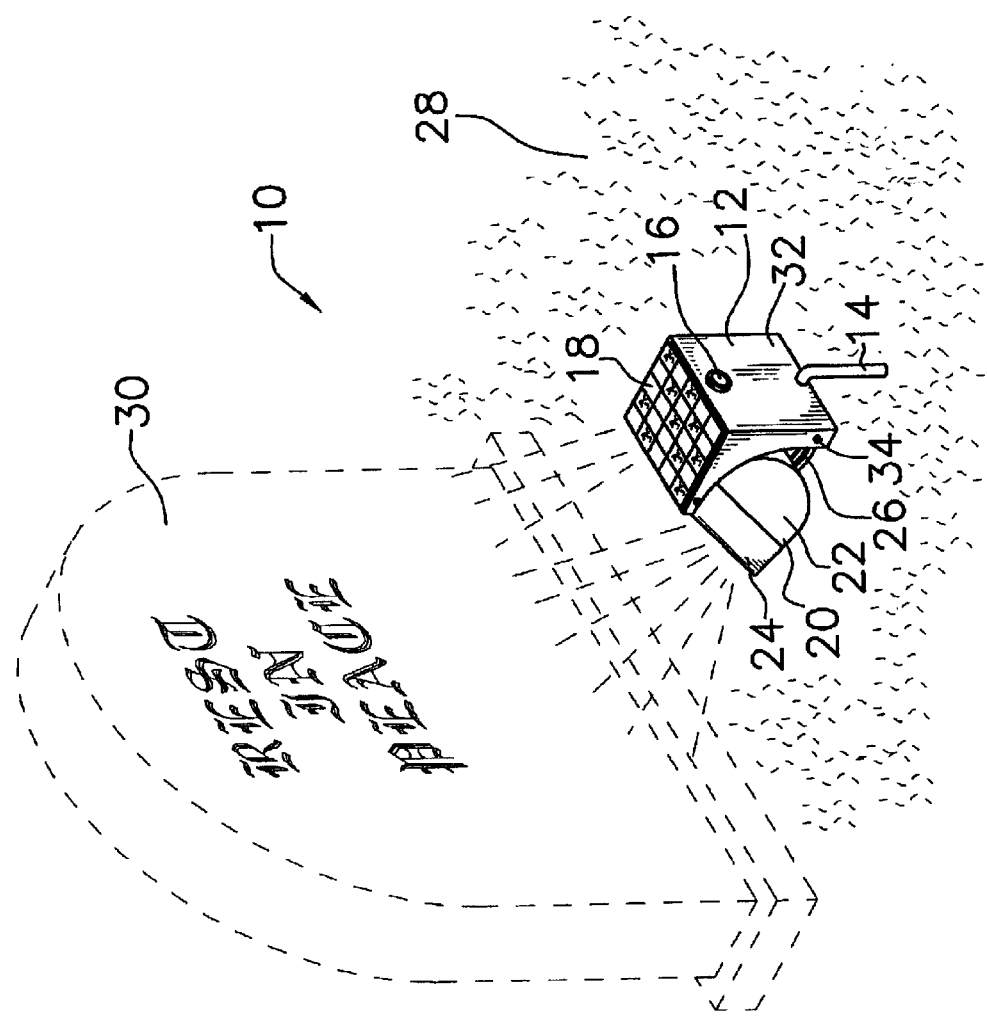
FIG. 1 is a top perspective view of the current embodiment of the illuminator constructed in accordance with the principles of the present invention.
Figure 2:
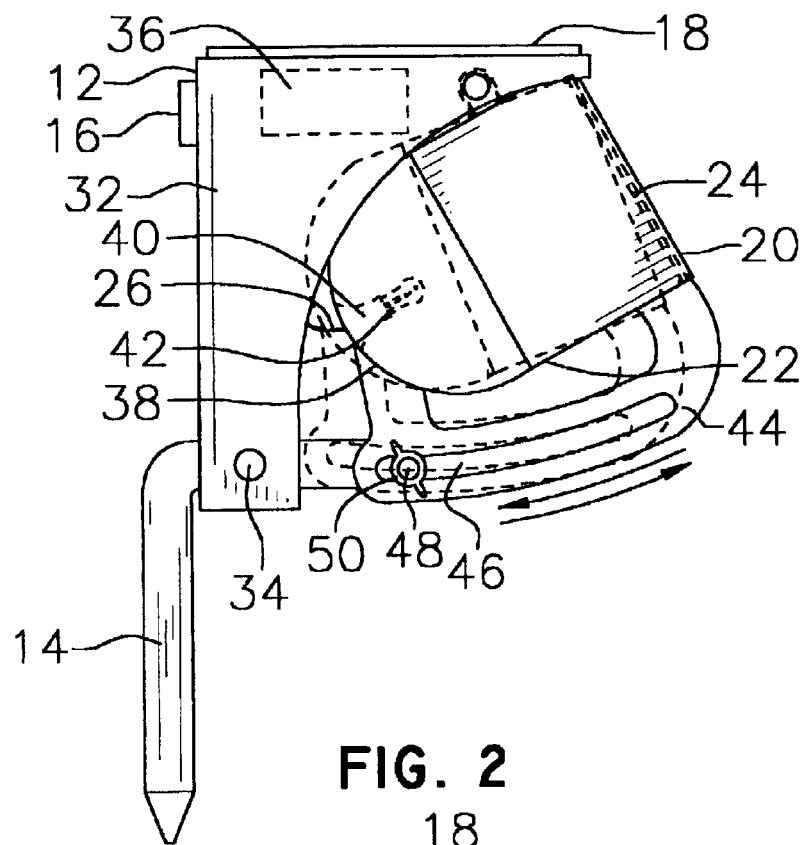
FIG. 2 is a right side view of the illuminator of the present invention.
Figure 3:
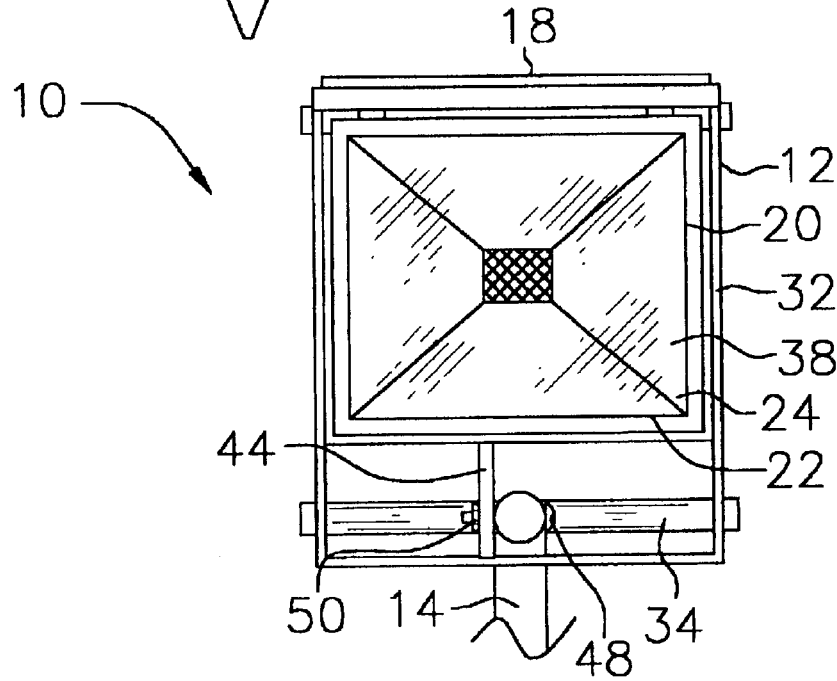
FIG. 3 is a front side view of the illuminator of the present invention.

Referring now to the drawings, and particularly to FIGS. 1–3, a current embodiment of the illuminator of the present invention is shown and generally designated by the reference numeral 10.

In FIG. 1, a new and improved illuminator 10 of the present invention for illuminating tombstones is illustrated and will be described. More particularly, the illuminator 10 has a housing 12 consisting of an enclosure 32 and a rod mount 34. Enclosure 32 has a top, a rear, two opposing L-shaped sides with a concave edge, and two open sides. The rear of enclosure 32 is pierced by a rod mount 34. Rod 14 is attached to rod mount 34 and secures illuminator 10 in the ground 28. Solar collector 18 is attached to the top of enclosure 32. Solar collector 18 converts ambient sunlight into electricity to power light 20. A photocell light detector 16 is attached to the rear of enclosure 32. Photocell light detector 16 measures the amount of ambient light and turns on light 20 when the level of ambient light falls below ant established level. Wire 26 connects light 20 with photocell light detector 16. Light 20 has a light housing 22. Lens 24 covers the front of light housing 22 and focuses emitted light on tombstone 30. In the current embodiment, housing 12 and rod 14 are made of plastic. Note that the broken lines illustrating the ground 28 and tombstone 30 are for illustrative purposes only and are not part of the current invention.

Moving on to FIG. 2, a new and improved illuminator 10 of the present invention for illuminating tombstones is illustrated and will be described. More particularly, the illuminator 10 has a housing 12 consisting of enclosure 32 and rod mount 34. Rod mount 34 connects enclosure 32 with rod 14. Rod 14 is pointed at one end so as to be easier to drive into ground 28 (not shown). Solar collector 18, mounted atop enclosure 32, provides electricity to battery 36 when solar collector 18 is exposed to sunlight. Photocell light detector 16 governs when electricity flows from battery 36 to power light 20. Wire 26 connects light 20 with photocell light detector 16. Light 20 is hingedly attached to the top of enclosure 32 and has a light housing 22. Alignmnent adjuster 44 is connected to the bottom of light housing 22. The bottom of alignment adjuster 44 has an alignment adjustment slot 46 connected to the middle of rod 14 by screw 48 and wing nut 50. Light housing 22 encloses a reflector 38 and has a bulb holder 40 attached to its rear. Bulb 42 is mounted in bulb holder 40. Lens 24, covering the front of light housing 22, focuses light emitted from bulb 42 in the direction established by the placement of alignment adjuster 44 with respect to screw 48 and wing nut 50. In the current embodiment, reflector 38 is made of metal-coated plastic, and battery 36 is of the rechargeable type.

Concluding with FIG. 3, a new and improved illuminator 10 of the present invention for illuminating tombstones is illustrated and will be described. More particularly, the illuminator 10 has a solar collector 18 mounted atop enclosure 32 of housing 12. Lens 24 of light 20 is shown covering the front of light housing 22; reflector 38 is visible behind lens 24. Light 20 has alignment adjuster 44 attached to its bottom. Alignment adjuster 44 is connected to rod 14 by screw 48 and wing nut 50. Rod mount 34 connects the rear of enclosure 32 to rod 14.

In use, it can now be understood that illuminator 10 is placed in a position exposed to ambient sunlight in front of tombstone 30. Rod 14 is driven into ground 28 to secure illuminator 10 in position. Wing nut 50 is loosened so that light 20 can pivot about its hinged attachment to enclosure 32. Light 20 is pivoted until light emitted from bulb 42 is focused through lens 24 onto tombstone 30 in the desired location. Wing nut 50 is then tightened to lock light 20 into position. When exposed to ambient sunlight, solar collector 18 produces electricity and charges battery 36. While photocell light detector 16 detects ambient light above an established level, electricity does not flow from battery 36 to light 20. However, once ambient light levels fall below an established level, photocell light detector 16 allows electricity to flow from battery 36 along wire 26 to power bulb 42. Once ambient light returns, photocell light detector 16 interrupts the flow of electricity from battery 36 to bulb 42, thereby extinguishing light 20 and permitting battery 36 to recharge.

While a current embodiment of the illuminator has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as steel, aluminum, titanium, or carbon fiber composite may be used instead of the plastic rod and housing described. Also, the metal-coated plastic reflector may also be made of steel, aluminum, or mirrors. And although illuminating tombstones has been described, it should be appreciated that the illuminator herein described is also suitable for illuminating a variety of objects, such as buildings, signs, and paths. Furthermore, a wide variety of power sources may be used instead of the solar collector and rechargeable battery described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An illuminator comprising:
    a hollow housing wherein said housing comprises:
        hollow enclosure having two open sides,
        a top,
        a back, and two opposing sides;
    a rod mount inserted through said two opposing sides of said enclosure
    a rod having opposing ends and a middle with said middle connected to said housing;
    a power source attached to said housing; and
    a light connected to said housing.

2. The illuminator as defined in claim 1 further comprising:
    a screw threadedly inserted through said rod; and
    a wing nut threadedly attached to said screw.

3. An illuminator comprising:
    a hollow housing having a top and a bottom;
    a light hingedly attached to said top of said housing;
    a ground securer attached to said bottom of said housing wherein said ground securer comprises:
        a rod having opposing ends and a middle; and
        a rod mount inserted through said middle of said rod; and
    a power source connected to said light.

4. The illuminator as defined in claim 3, wherein said end of said rod is pointed.

5. The illuminator as defined in claim 3, wherein said light comprises:
    an alignment adjuster having a bottom and a top;
    an alignment adjustment slot wherein said bottom of said alignment adjuster defines a slot therein to comprise said alignment adjustment slot;
    a screw inserted through said alignment adjustment slot;
    a wing nut threadedly attached to said screw;
    a hollow light housing having a front, a rear, and a bottom with said bottom connected to said top of said alignment adjuster;
    a reflector enclosed by said light housing;
    a bulb holder attached to said rear of said light housing;
    a bulb inserted into said bulb holder;
    a wire having opposing ends with one end connected to said bulb and said opposing end connected to said power source; and
    a lens covering said front of said light housing.

6. The illuminator as defined in claim 5, further comprising a photocell light detector connected between said wire and said power source.

7. An illuminator comprising:
    a hollow housing having a top, a bottom, two opposing sides with a front edge, and two open sides;
    a hollow light housing having a front, a rear, a top, and a bottom with said top hingedly attached to said top of said housing;
    a reflector enclosed by said light housing;
    a bulb holder attached to said rear of said light housing;
    a bulb inserted into said bulb holder;
    a wire having opposing ends with one end connected to said bulb;
    a switch connected to said opposing end of said wire;
    a lens covering said front of said light housing;
    a power source connected to said switch;
    an alignment adjuster having a bottom and a top with said top attached to said bottom of said light housing;
    an alignment adjustment slot wherein said bottom of said alignment adjuster defines a slot therein to comprise said alignment adjustment slot;
    a screw inserted through said alignment adjustment slot; and
    a wing nut threadedly attached to said screw.

8. The illuminator as defined in claim 7, further comprising a rod having opposing ends and a middle with said middle pierced by said screw.

9. The illuminator as defined in claim 7, wherein said power source comprises:
    a solar collector mounted on said top of said housing; and
    a rechargeable battery connected to said solar collector.

10. The illuminator as defined in claim 7, wherein said opposing sides are L-shaped and said front edge is concave in shape.

* * * * *